United States Patent
Arsenault et al.

(10) Patent No.: US 6,360,319 B1
(45) Date of Patent: Mar. 19, 2002

(54) METHOD AND APPARATUS FOR STORING AND RETRIEVING SYSTEM REVISION INFORMATION

(75) Inventors: Brian Arsenault, Leicester; Victor W. Tung, Shrewsbury, both of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/224,973

(22) Filed: Jan. 4, 1999

(51) Int. Cl.[7] .............................................. G06F 15/177
(52) U.S. Cl. ........................................... 713/1; 713/100
(58) Field of Search ...................... 713/1, 100

(56) References Cited

U.S. PATENT DOCUMENTS

| | | | | |
|---|---|---|---|---|
| 5,325,368 A | * | 6/1994 | James et al. | 714/727 |
| 5,343,478 A | * | 8/1994 | James et al. | 714/726 |
| 5,530,895 A | * | 6/1996 | Enstrom | 710/9 |
| 5,794,066 A | * | 8/1998 | Dreyer et al. | 712/32 |
| 5,867,714 A | * | 2/1999 | Todd et al. | 395/712 |
| 5,974,474 A | * | 10/1999 | Furner et al. | 710/8 |

* cited by examiner

Primary Examiner—Dennis M. Butler
(74) Attorney, Agent, or Firm—Daly, Crowley & Mofford, LLP

(57) ABSTRACT

A method and a control device is provided for upgrading computer system hardware, for example, on a printed circuit board, with system revision information. The method includes receiving, a serial data stream having data bits associated with the system revision information through a serial input of the control device, determining the start of the data bits, and storing at least a portion of the data bits associated with the system revision information within a read-only register of the control device.

36 Claims, 4 Drawing Sheets

METHOD AND APPARATUS FOR STORING AND RETRIEVING SYSTEM REVISION INFORMATION

BACKGROUND OF THE INVENTION

The invention relates generally to storing and retrieving system revision information and, in particular, for upgrading computer system hardware on a printed circuit board with the system revision information.

A computing system generally includes hardware, the actual physical components of the system, and software, the non-hardware components (i.e., programs) used to perform the intended tasks of the system. Software stored in a programmable memory and executed at start up of the system is generally referred to as "firmware".

With the rapid change in computer technology, it is often the case that a computer system requires "upgrading." That is, newer and better hardware or software is substituted for the hardware or software being used on the system. Upgrading is also performed in order to fix "bugs" or other problems with an earlier version of the software.

During the development of a new computer system, the ability to make upgrades to the system is especially critical. In these new systems, changes to the manner in which different components of the system communicate with each other and the speeds at which they do so may be changed. For example, the main printed circuit board of a computer system (often referred to as the "motherboard") generally contains one or more communication buses, a microprocessor, input/output peripheral device controller and interfaces. As these changes are introduced and tested, (e.g., through engineering change orders (ECOs), or temporary change orders (TCOs)) it is vital that the present status of the system and its hardware and the manner in which it is being operated be known. This is particularly important in the development of new products where new features are being tested and introduced at a rapid rate.

One approach for introducing new upgrades to a system is through the use of a programmable device installed on the board to keep track of the type and revision status of the system. The programmable device, however, generally contains other system information relating to the system's functionality. The programmable device would also be responsible for the control of other system functions, such as programming of EPROMs and updating the "time of day" stamp. However, whenever the system is updated by the programmable device with system revisions and upgrades, the system's timing specifications (e.g., setup and hold times) are at risk of being violated and register performance maybe impacted.

One solution to this problem is to replace the programmable logic devices with application specific integrated circuits (ASICs). As is well known in the art, an ASIC is an integrated circuit designed to perform a particular function by defining the interconnection of a set of basic building blocks drawn, for example, from a library provided by the circuit manufacturer. Because an ASIC is designed for a specific purpose, reliability and performance is generally increased while simultaneously providing a cost reduction. Unfortunately, however, an ASIC device is not reprogrammable when a system or board change/upgrade is implemented.

SUMMARY OF THE INVENTION

The invention relates to a method and a control device for upgrading computer system hardware, e.g., mounted on a printed circuit board) with system revision information.

In a general aspect of the invention, the method features the steps of receiving a serial data stream including data bits associated with the system revision information through a serial input of the control device (e.g., an ASIC device), determining the start of the data its, and storing at least a portion of the data bits associated with the system revision information within a read-only register of the control device.

In a related aspect of the invention, a control device is configured to be mounted on the printed circuit board and includes a serial input for receiving a serial data stream including data bits associated with the system revision information; logic circuitry for receiving the serial data stream from the serial input, and a read-only register for storing the set of data bits associated with the system revision information.

With this approach and arrangement, an efficient and reliable approach for updating system revision information of the computer system hardware on a printed circuit board is provided. The method and apparatus described above have other advantages. For example, because the method receives the system revision information serially (rather than in parallel), only a single serial input is required by the control device to receive the data. Thus, other inputs (e.g., terminal pins) of the control device are free to be used to perform other functionality of the control device, thereby making the control device a shared resource device. Moreover, because the register is a read-only register, any risk that the contents can be overwritten by the user is eliminated.

Embodiments of these aspects of the invention may include one or more of the following additional steps.

A header is appended to the beginning of the set of data bits associated with the system revision information, so that the control device can identify the beginning of the set of data bits and distinguish it from other sets of system revision information in the serial data stream.

The data bits associated with the system revision information are sent as pairs of repeated data bits having the same logical value. By checking to see whether both bits of a pair have the same logical value, the method and control device having this feature minimizes the risk that errors are introduced during the transmission of the data.

In one embodiment, the first of the pair of bits is stored, for example in a temporary, shadow register. For example, the first bit is stored into the read-only register from the second register upon verification of the set of data bits and reading a next header associated with a next set of data bits.

The invention is particularly advantageous when the control device is a shared-resource control device providing additional functionality to the computer system hardware on the printed circuit board. The control device is a non-programmable device, preferably an application specific integrated circuit (ASIC) or masked programmed field programmable grid array (FPGA).

Other features of the invention will be apparent from the following description of the preferred embodiments and from the claims.

DETAILED DESCRIPTION

Figure 1:
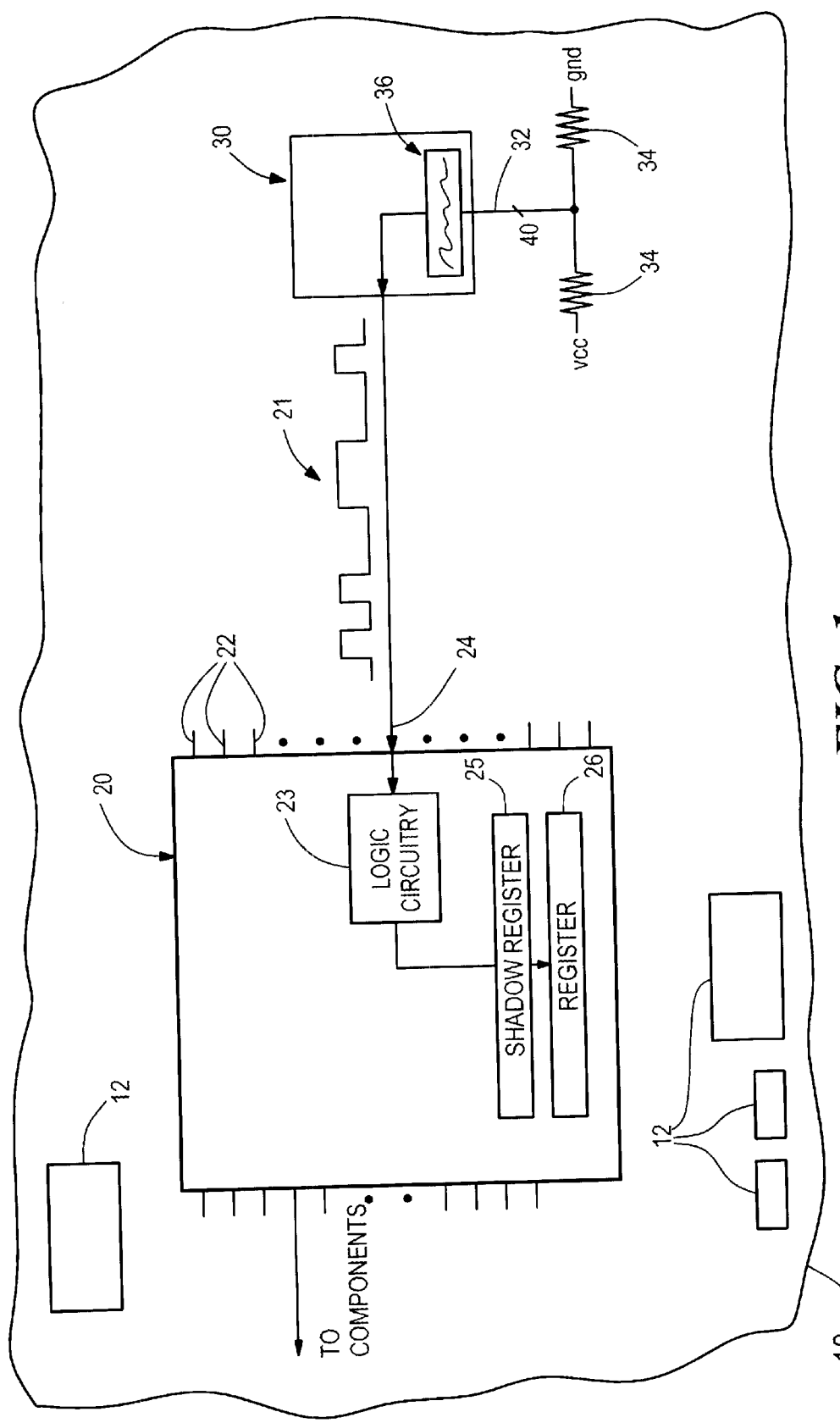
FIG. 1 is a schematic block diagram of a revision information storage and retrieval system in accordance with the invention.

The invention relates to a computing system, such as a disk storage system controller, which requires its control and revision status software to be updated. Updating the system may be required to implement new software, for example, or to add or remove control functionality, test new features increase the performance of the system. Referring to FIG. 1, the computing system includes a motherboard 10 (only a portion is shown) having various components 12 including a shared resource control device 20. Components 12 represent, for example, processors, memories, or other integrated circuits and discrete devices to illustrate that many other devices typically populate motherboard 10. Shared resource control device 20 is a non-programmable device responsible for providing a wide variety of different functions to motherboard 10 and components 12. In this embodiment, shared resource control device 12 is provided as an application specific integrated circuit (ASIC) designed and tailored to provide various control functions, such as, communication between components 12 (e.g., arbitration between processors), and programming of EEPROM memories. As will be discussed in greater detail immediately below, along with the various other functionality provided by shared resource control device 20, the device is used to store and retrieve system revision information associated with motherboard 10 when the system is upgraded.

Shared resource control device 20 includes a number of pins 22 (e.g., 44 pins), one of which serves as a serial data input 24 for the system revision information provided to the device. In general, shared resource control device 20 receives the system information in the form of a serial data stream 21, checks the validity of the stream using logic circuitry 23, and stores the information in a read-only register 26 within the device. It is important to note that a user can not write data into register 26; rather, the register can only be updated by serial data stream 21. For reasons discussed in detail below, shared resource control device 20 also includes a shadow register 25, which is used as an intermediate storage element before data is finally passed to read-only register 26.

In most cases, the serial data stream carrying the revision information is provided to shared resource control device 20 from a programmable logic array (PLA) device 30. PLA device 30 and shared resource control device 20 operate at the same clock frequency from a common clock. Although PLA device 30 may be physically located off-board (e.g., on an auxiliary board), the PLA device is preferably mounted on the same board as shared resource control device 20.

PLA device 30 has as many as forty inputs 32 and is connected via an IEEE 1149.1 JTAG port for reprogrammability. As known in the art, IEEE 1149.1 is a boundary scan architecture standard defining an accepted and specific method for reprogramming devices. The core reference for the standard is: IEEE Standard 1149.1-1990 "Test Access Port and Boundary-Scan Architecture", available from the IEEE, 445 Hoes Lane, P.O. Box 1331, Piscataway, N.J., and incorporated herein by reference.

A series of pullup/pulldown discrete resistors 34 are connected to some or all of inputs 32 of PLA device 30. As engineering change orders (ECOs) or temporary change orders (TCO) are implemented to change the system configuration or board capabilities, the values of resistors 34 are changed at the time of rework. Note that only one resistor per pullup/pulldown pair may be populated at any given time. Connecting both resistors or neither resistor will yield unknown results. The population of each resistor provides information about the system. In particular, a resistor connected to a high voltage (e.g., 5 volts) represents a logic level 1 or "true" condition. On the other hand, a resistor tied to a low voltage (e.g., ground, O volts) represents a logic level 0, or a "false" condition. A logic level 1 generally indicates that an option is installed or enabled on the board, while a logic level 0, indicates that this feature is disabled or not present.

PLA device 30 also includes a series of registers 36 having internally set bits, which indicate the main board type (e.g., disk controller versus mainframe host controller) or starting board revision level. At power up, motherboard 10 is released from reset and is placed in normal operation. PLA device 30 operates as a shift register, taking the contents of the register before it and passes the contents along to the next register on each clock transition. The output of the first register wraps back around to the last register in the chain, creating a continuous loop. At power up, PLA device 30 reads all the inputs tied to resistors 34 and each internal register and stores that information. Upon each rising edge of the clock, the data is "pushed" through PLA device 30 and out via an output pin 35. Pin 35 is connected to the serial data input 24 of shared resource control device 20 reserved for data stream 21. During a reset state, the contents of PLA device 30 are flushed and each input is read again into the PLA device.

Figure 2:
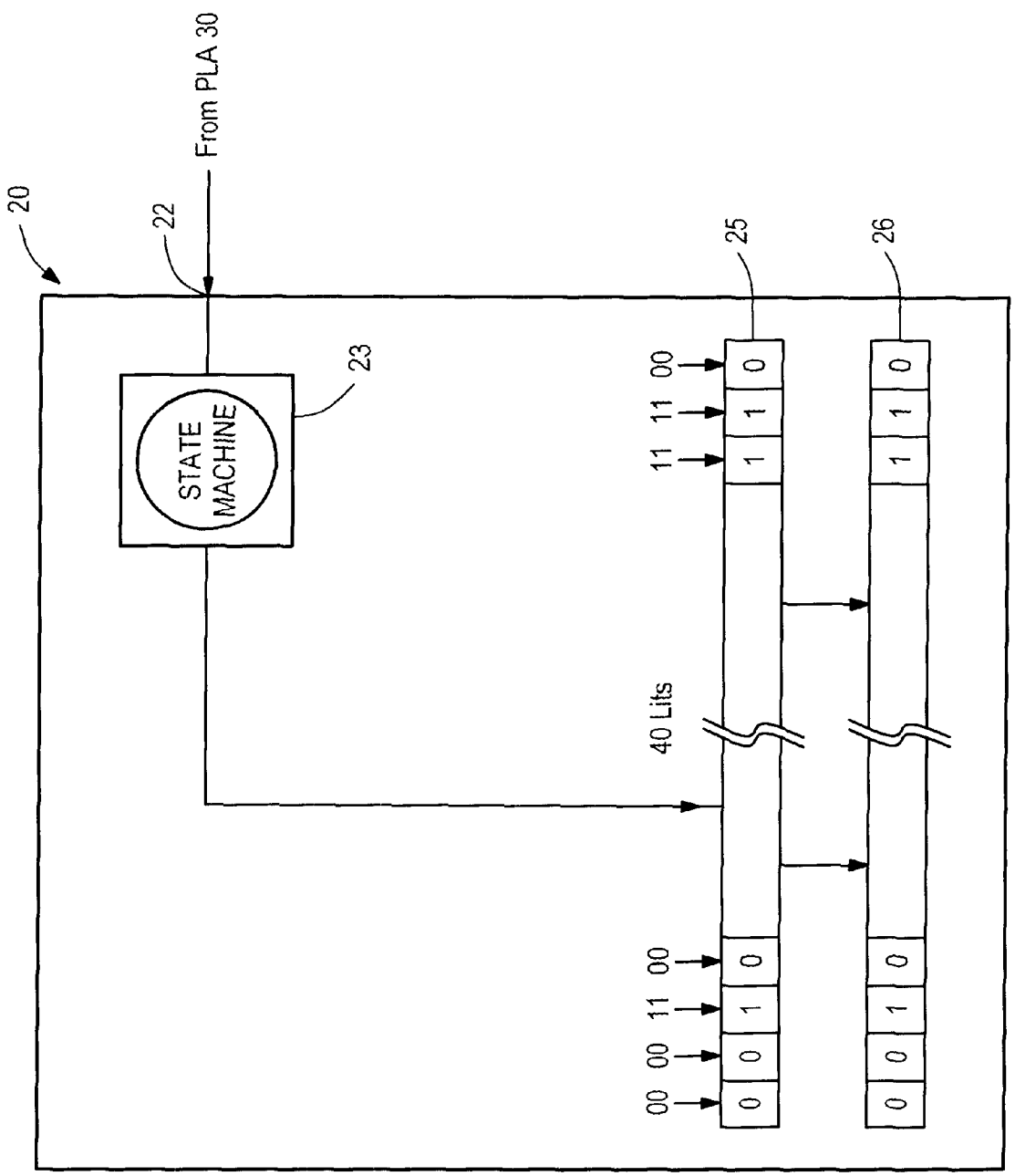
FIG. 2 is a diagrammatic representation of the registers and state machine of an ASIC of the system of FIG. 1.

Referring to FIG. 2, shared resource control device 20 includes combinatorial logic circuitry 23 which is used to determine the start of sequences of system revision data and, if valid, then stores the bits of the data into a shadow register 25. Logic circuitry 25 can be provided in any of a number of different configurations, and is shown, here represented by a finite state machine operating in accordance with the state transition diagram of FIG. 3. As will be described in greater detail below, shared resource control device 20 operates to ensure that the serial data stream 21 is accurate before being read into read-only register 26. Furthermore, because the data is presented in serial fashion, a header 40 (FIG. 4) is used to establish the start of a sequence of data bits representing a set of data to be read into register 26. Header 40 is four bits long and, in this embodiment, has a preselected bit sequence of "0101". In other words, when this particular sequence of bits is read by logic circuitry 23, the sequence is recognized as representing the start of data to be read into shadow register 25 and, thereafter, into a read-only register 26.

Figure 3:
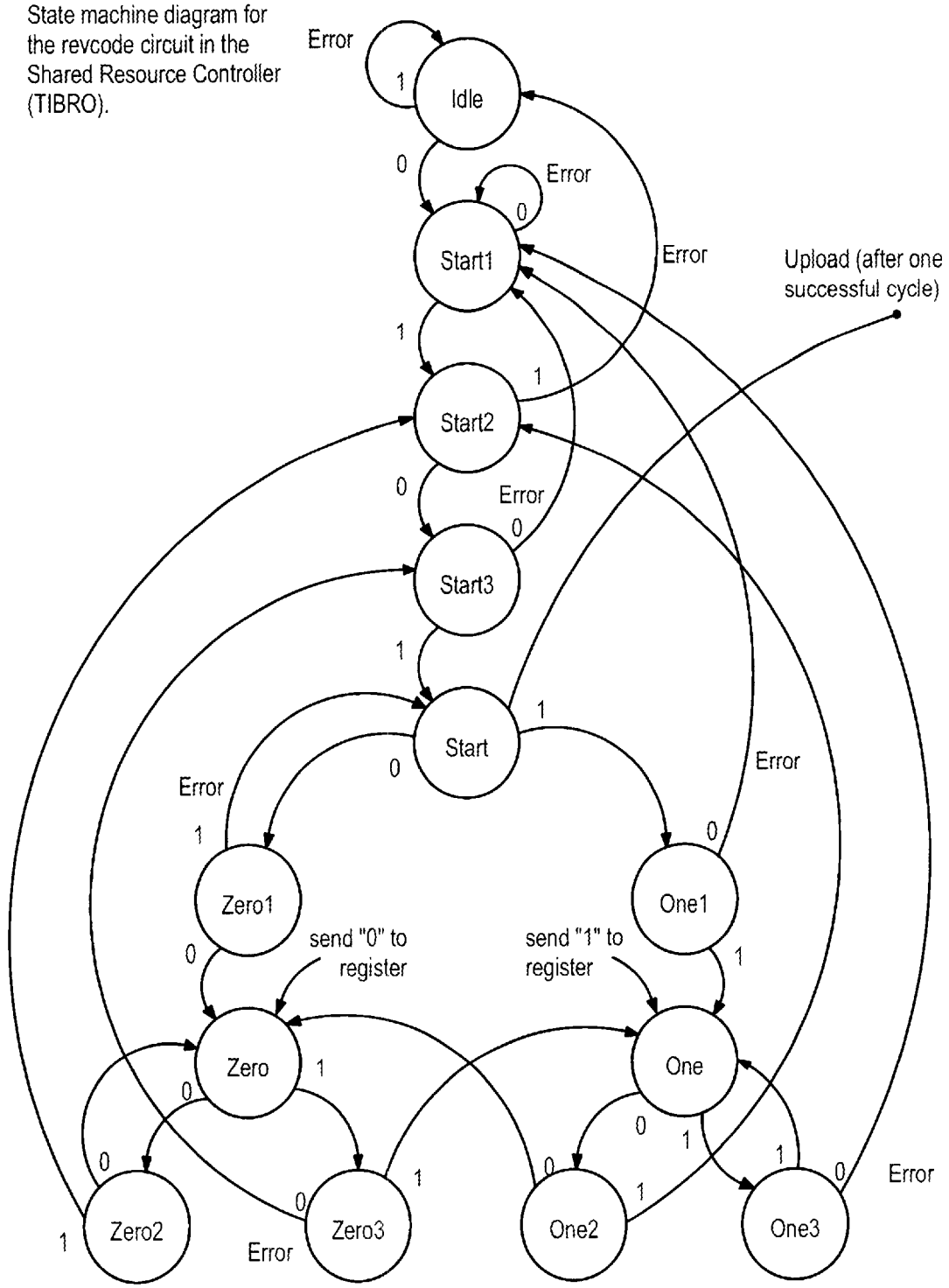
FIG. 3 is a state transition diagram illustrating transitions between states of the ASIC of FIG. 1.

With reference to the state transition diagram of FIG. 3, the operation of logic circuitry 23 will now be described. In general, the Start1, Start2, and Start3 states represent the steps performed to determine whether header 40 is read, thereby establishing the beginning of a sequence of data corresponding to the system revision information. Zero1, Zero2, Zero3 and One1, One2, One3 all represent states associated with receiving and storing the first of a back-to-back pair of logic value 0 and logic 1 values, respectively, into shadow register 25. Finally, Zero and One states are associated with receiving and storing the second of a back-to-back pair of logic value 0 and logic 1 values, respectively, into shadow register 25. After all of the data bits are read into shadow register 25, without error, and, upon receipt of the next header of the next set of data bits, the contents of the shadow register are then transferred into read-only register 26.

More specifically, shared resource control device 20 lies in an idle state (Idle) until bits of data are received through input 24. Because the leading bit of header 40 was preselected to have a logic level 0, if the initially read bit of data stream 21 has a logic level 1, logic circuitry deems the bit to be in error and awaits the next bit. Upon reading a bit from data stream 21 having a logic 0, logic circuitry 23 assumes that the bit is the leading bit of header 40 and reads the next bit (Startl). Because the second bit of header 40 is expected to have a logic level 1, unless the bit has this value, logic circuitry 23 deems the bit to be in error and returns to the Idle condition to await the start of legitimate data bit sequence. On the other hand, if the second bit has a logic level 1, logic circuitry 23 reads the third bit (Start2), expecting it to have a logic level 0 value. If not, logic circuitry 23 deems the bit to be in error and, once again, returns to the Idle condition to await the start of legitimate data bit sequence. If the third bit has a logic level 0, logic circuitry 23 reads the fourth bit of the sequence (Start3).

If the logic level is 0, logic circuitry assumes that the previous bit is the leading bit of header 40 and returns to the Start2 condition. On the other hand, if the fourth bit has a logic level 1, the proper sequence of header 40 is considered to be complete and logic circuitry begins the process of reading the actual bits representing the system revision information (Start). After header 40 is read and confirmed, to ensure the accuracy of the data stream representing the system revision information, each bit is sent twice (back-to-back) to indicate the state of the bit.

Figure 4:
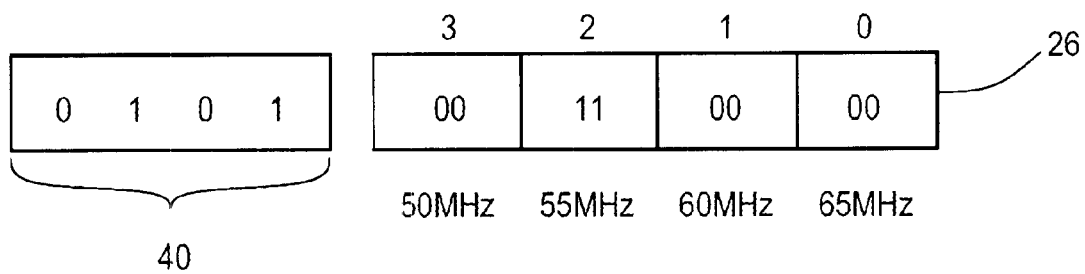
FIG. 4 represents a read-only register of the ASIC of FIG. 1.

The sequence of repeated (back-to-back) data bits received by the logic circuitry following the header is associated with the system revision information. Referring to FIG. 4, assume that a four bit register contains information about the speed of a processor on motherboard 10. In this case, only one of the four bits is to be set at any time for the information to be valid. The four bits are ultimately stored within read-only register 26 after being transferred from a second, shadow register 25, which must be loaded correctly before the bits are sent to register 26.

As shown in FIG. 4, assume a serial data stream of:
010100110000010100. . .

If these bits are spread out, each stage of the data can be seen as:
0101 00 11 00 00 0101 00. . . The 0101 at the beginning is header 40. The next two bits indicate the value to be loaded into bit 3. The following pair of bits for bit 2, and so on. If we look at this data stream, we can see that the system is running at 55 MHz.

Figure 5A:
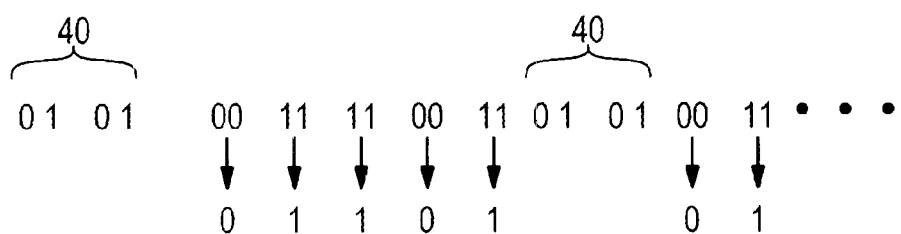
FIG. 5A is an exemplary input data stream without errors provided to the ASIC of FIG. 1.

Referring to FIG. 5A, to illustrate the function of logic circuitry 23, five exemplary bits of data (01101) to be read into register 26 are shown. Referring again to FIG. 3, when the first bit is logic level 0 (as is the case in this example), logic circuitry stores the bit into shadow register 25 and awaits the next bit to see if the succeeding bit also has a logic level 0 (Zero1). If not, the first bit is deemed to have been read in error and returns to the Start state. If the following bit is a logic level 0, this logic level is read from shadow register 25 into read-only register 26.

The next bit is then read (Zero2) and is stored in the next bit position of shadow register 25. If the succeeding bit is also a logic level 0, this logic level is read from shadow register 25 into the next bit position of read-only register 26. However, as is the case in the example of FIG. 4A, if the first of the second pair of bits is read as having a logic level 1 (Zero3), this logic value is stored in the next bit position of shadow register 25 second bit. Then, if the second of the pair of the bits is also a logic level 1, logic level 1 is read into the next bit position of read-only register 26 from shadow register 25 (One).

Similarly, if the first bit has a logic level 1, logic circuitry 23 stores the bit into shadow register 25 and awaits the next bit to see if the succeeding bit also has a logic level 1 (One1). If not, the first bit is deemed to have been read in error and returns to the Start1 state, as indicating the possibility that header is being read. If the following bit is a logic level 1, this logic level is read from shadow register 25 into read-only register 26 (One). If the first bit of the next pair of bits also has a logic level 1, the bit is temporarily stored into shadow register 25 and the next bit is read (One3) to see if it has the same logic value. If so, this logic level is once again read from shadow register 25 into read-only register 26 (One). If not, the bit is deemed to have been read in error and returns to the Start1 state, as indicating the possibility that header is being read.

After successfully reading the data sequence 01101 of FIG. 5A, logic circuitry reads a second header 42 indicating that a next data stream is arriving as well as indicating that the previous string of data bits (i.e., 01101) occurred without error, so that the contents of read-only register 26 can be "uploaded".

Figure 5B:
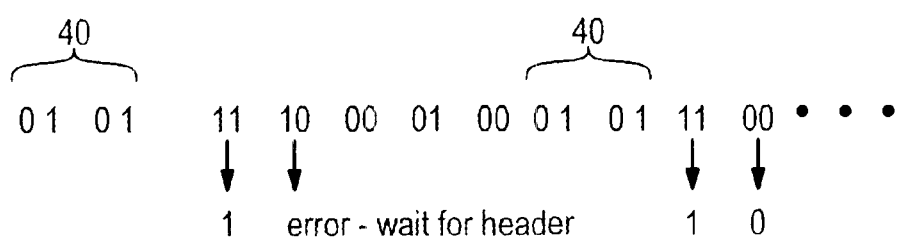
FIG. 5B is an example of an input data stream having an error provided to the ASIC of FIG. 1.

Referring to FIG. 5B, an example of sequence of data having an error within a data stream is shown. In this case, a string of data bits 1110 is intended to be read into register 26. After the successful reading of header 40, logic circuitry 23 reads, in succession, the first and second bits of input data stream 21. Because these bits have the same logic value (here, logic value 1), the logic value is passed into shadow register 25. Logic circuitry 23 then reads the next pair of bits to determine whether their respective logic values are the same. In this case, they are not and logic circuitry 23 then interprets the result as an error. Logic circuitry 23 then awaits the arrival of a new header and, at that point, the contents of shadow register 25 are transferred into read-only register 26.

Additions, subtractions, and other modifications of the disclosed preferred particular embodiments of the invention will be apparent to those practicing the field and are within the scope of the following claims.

What is claimed is:

1. A method for providing computer system hardware on a printed circuit board with an indication of information characteristic of such printed circuit board, the method comprising:
  providing a signal representative of the information characteristic of the printed circuit board;
  converting the signal into a corresponding serial data stream;
  receiving the serial data stream at a serial input of a control device on the printed circuit board;
  determining the start of the serial data stream; and
  storing at least a portion of the serial data stream within a read-only register of the control device.

2. The method of claim 1 further comprising appending a header to the beginning of the at least a portion of the serial data stream.

3. The method of claim 2 wherein the appended header identifies the beginning of the at least a portion of the serial data stream.

4. The method of claim 3 further comprising sending the serial data stream as pairs of repeated data sets, each one of the sets having the same logical values.

5. The method of claim 4 further comprising verifying the accuracy of the set of data bits by determining whether the pairs of repeated data sets have the same logical values.

6. The method of claim 5 wherein verifying the accuracy of the transmitted data includes storing the first of the pair of data sets in a temporary register.

7. The method of claim 6 further comprising transferring the first stored data set into the read-only register upon verification of the accuracy of the set of data and reading a next header associated with a next set of data.

8. The method of claim 1 wherein the control device is a shared-resource control device providing additional functionality to the computer system hardware on the printed circuit board.

9. The method of claim 8 wherein the control device is an application specific integrated circuit.

10. The method of claim 9 wherein the serial input of the control device is a single input terminal.

11. A control device mounted on a printed circuit board having computer system hardware, the control device configured to upgrade the computer system hardware with printed circuit board information characteristic of such printed circuit board revision, the control device comprising:

a circuit for producing a signal representative of the information characteristic of the printed circuit board;

a converter for converting the signal into a corresponding serial data stream;

a serial input for receiving the serial data stream;

logic circuitry for receiving the serial data stream from the serial input, the logic circuitry configured to determine the start of the serial data stream; and a read-only register for storing the serial data stream.

12. The control device of claim 11 wherein the logic circuitry is configured to identify an appended header as the beginning of the serial data stream.

13. The control device of claim 12 wherein the logic circuitry is configured to receive the serial data stream as pairs of repeated data bits having the same logical value.

14. The control device of claim 13 wherein the logic circuitry is configured to verify the accuracy of the data bits by determining whether the pairs of repeated data bits have the same logical value.

15. The control device of claim 14 further comprising a second register for temporarily storing a first one of a pair of the first series of data bits prior to storing the set of series of data bits in the read-only register.

16. The control device of claim 15 further comprising a second register for temporarily storing a first series data bits prior to storing the set of the series of data bits in the read-only register.

17. The control device of claim 16 wherein the logic circuitry is configured to transfer the first stored bit from the second register into the read-only register upon verification of the accuracy of the set of data bits and reading a next header associated with a next set of data bits.

18. The control device of claim 11 further including digital circuitry for performing additional functionality to the computer system hardware on the printed circuit board.

19. A method for providing computer system hardware on a printed circuit board with an indication of information characteristic of such printed circuit board, the method comprising:

generating a signal on the printed circuit board representative of the information characteristic of the printed circuit board;

converting, on the printed circuit board, the signal into a corresponding serial data stream;

receiving the serial data stream at a serial input of a control device on the printed circuit board;

determining the start of the serial data stream; and storing at least a portion of the serial data stream within a read-only register of the control device.

20. The method of claim 19 further comprising appending a header to the beginning of the at least a portion of the serial data stream.

21. The method of claim 19 wherein the appended header identifies the beginning of the at least a portion of the serial data stream.

22. The method of claim 21 further comprising sending the serial data stream as pairs of repeated data sets, each one of the sets having the same logical values.

23. The method of claim 21 further comprising verifying the accuracy of the set of data bits by determining whether the pairs of repeated data sets have the same logical values.

24. The method of claim 23 wherein verifying the accuracy of the transmitted data includes storing the first of the pair of data sets in a temporary register.

25. The method of claim 24 further comprising transferring the first stored data set into the read-only register upon verification of the accuracy of the set of data and reading a next header associated with a next set of data.

26. The method of claim 19 wherein the control device is a shared-resource control device providing additional functionality to the computer system hardware on the printed circuit board.

27. The method of claim 26 wherein the control device is an application specific integrated circuit.

28. The method of claim 27 wherein the serial input of the control device is a single input terminal.

29. A control device mounted on a printed circuit board having computer system hardware, the control device configured to upgrade the computer system hardware with printed circuit board information characteristic of such printed circuit board revision, the control device comprising:

a circuit disposed on the printed circuit board for producing a signal representative of the information characteristic of the printed circuit board;

a converter disposed on the printed circuit board for converting the signal into a corresponding serial data stream;

a serial input for receiving the serial data stream;

logic circuitry for receiving the serial data stream from the serial input, the logic circuitry configured to determine the start of the serial data stream; and a read-only register for storing the serial data stream.

30. The control device of claim 29 wherein the logic circuitry is configured to identify an appended header as the beginning of the serial data stream.

31. The control device of claim 30 wherein the logic circuitry is configured to receive the serial data stream as pairs of repeated data bits having the same logical value.

32. The control device of claim 31 wherein the logic circuitry is configured to verify the accuracy of the data bits by determining whether the pairs of repeated data bits have the same logical value.

33. The control device of claim 32 further comprising a second register for temporarily storing a first one of a pair of the first series of data bits prior to storing the set of series of data bits in the read-only register.

34. The control device of claim 33 further comprising a second register for temporarily storing a first series data bits prior to storing the set of the series of data bits in the read-only register.

35. The control device of claim 34 wherein the logic circuitry is configured to transfer the first stored bit from the second register into the read-only register upon verification of the accuracy of the set of data bits and reading a next header associated with a next set of data bits.

36. The control device of claim 29 further including digital circuitry for performing additional functionality to the computer system hardware on the printed circuit board.

* * * * *